(12) United States Patent
Dong

(10) Patent No.: US 8,164,921 B2
(45) Date of Patent: Apr. 24, 2012

(54) COVER MECHANISM AND ELECTRONIC DEVICE USING SAME

(75) Inventor: Shui-Jin Dong, Shenzhen (CN)

(73) Assignees: Shenzhen Futaihong Precision Industry Co., Ltd., ShenZhen, Guangdon Province (CN); FIH (Hong Kong) Limited, Kowloon (HK)

( * ) Notice: Subject to any disclaimer, the term of this patent is extended or adjusted under 35 U.S.C. 154(b) by 337 days.

(21) Appl. No.: 12/627,040

(22) Filed: Nov. 30, 2009

(65) Prior Publication Data

US 2011/0069428 A1   Mar. 24, 2011

(30) Foreign Application Priority Data

Sep. 22, 2009   (CN) .......................... 2009 1 0307457

(51) Int. Cl.
*H05K 7/14* (2006.01)
(52) U.S. Cl. ........ 361/801; 361/726; 361/732; 361/747; 361/802; 361/803; 361/679.01; 361/798
(58) Field of Classification Search .................. 361/726, 361/732, 747, 801–803, 798
See application file for complete search history.

(56) References Cited

U.S. PATENT DOCUMENTS

| | | | | |
|---|---|---|---|---|
| 5,208,116 A | * | 5/1993 | Joh | 429/96 |
| 5,248,569 A | * | 9/1993 | Pine et al. | 429/97 |
| 5,621,618 A | * | 4/1997 | Komiyama | 361/732 |
| 5,716,730 A | * | 2/1998 | Deguchi | 429/97 |
| 5,740,012 A | * | 4/1998 | Choi | 361/679.39 |
| 6,108,196 A | * | 8/2000 | Jung | 361/679.55 |
| 6,272,005 B1 | * | 8/2001 | Jensen et al. | 361/679.41 |

FOREIGN PATENT DOCUMENTS

EP           635775 A1 *  1/1995

* cited by examiner

*Primary Examiner* — Hung S Bui
*Assistant Examiner* — James Wu
(74) *Attorney, Agent, or Firm* — Altis Law Group, Inc.

(57) ABSTRACT

A cover mechanism for an electronic device includes a protective cover, a resisting element, a control element, and a releasable element. The resisting element is attached to the electronic device. The control element engages with the resisting element. The protective cover latches to the control element. The releasable element provides a force to the protective cover for automatically opening the protective cover. When the control element is pressed, the control element forces the resisting element to unlock the protective cover.

16 Claims, 5 Drawing Sheets

COVER MECHANISM AND ELECTRONIC DEVICE USING SAME

BACKGROUND

1. Technical Field

The present disclosure relates to cover mechanisms used in electronic devices (e.g., mobile phones).

2. Description of Related Art

Electronic devices usually have external interfaces (e.g., universal serial bus (USB)) for electrically connecting external devices (e.g., printers), accessories (e.g., USB flash drives) or other electronic devices. Such external interfaces are usually protected by cover mechanisms from e.g., dust or water, to maintain proper functioning.

The cover mechanisms usually include covers with locks. The covers are typically locked to the electronic devices by latches to cover the area through which the interfaces of electronic devices are exposed. However, the covers are often not permanently attached to the electronic device. Thus, the covers may easily be misplaced or lost when not locked to the electronic devices.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the present cover mechanism. Moreover, in the drawings, like reference numerals designate corresponding parts throughout the several views, in which.

DETAILED DESCRIPTION

Figure 1:
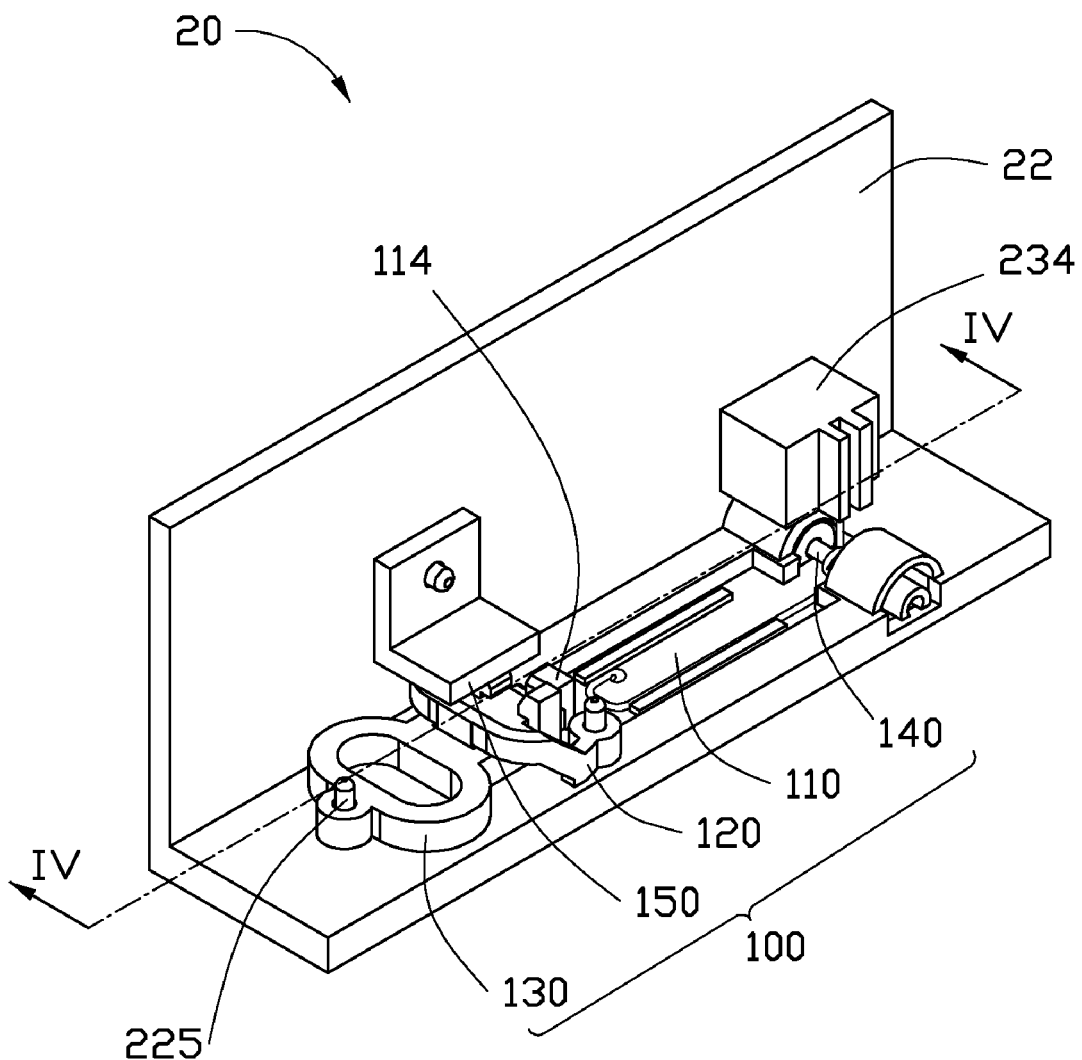
FIG. 1 is an assembled, isometric view of an exemplary cover mechanism.
Figure 2:
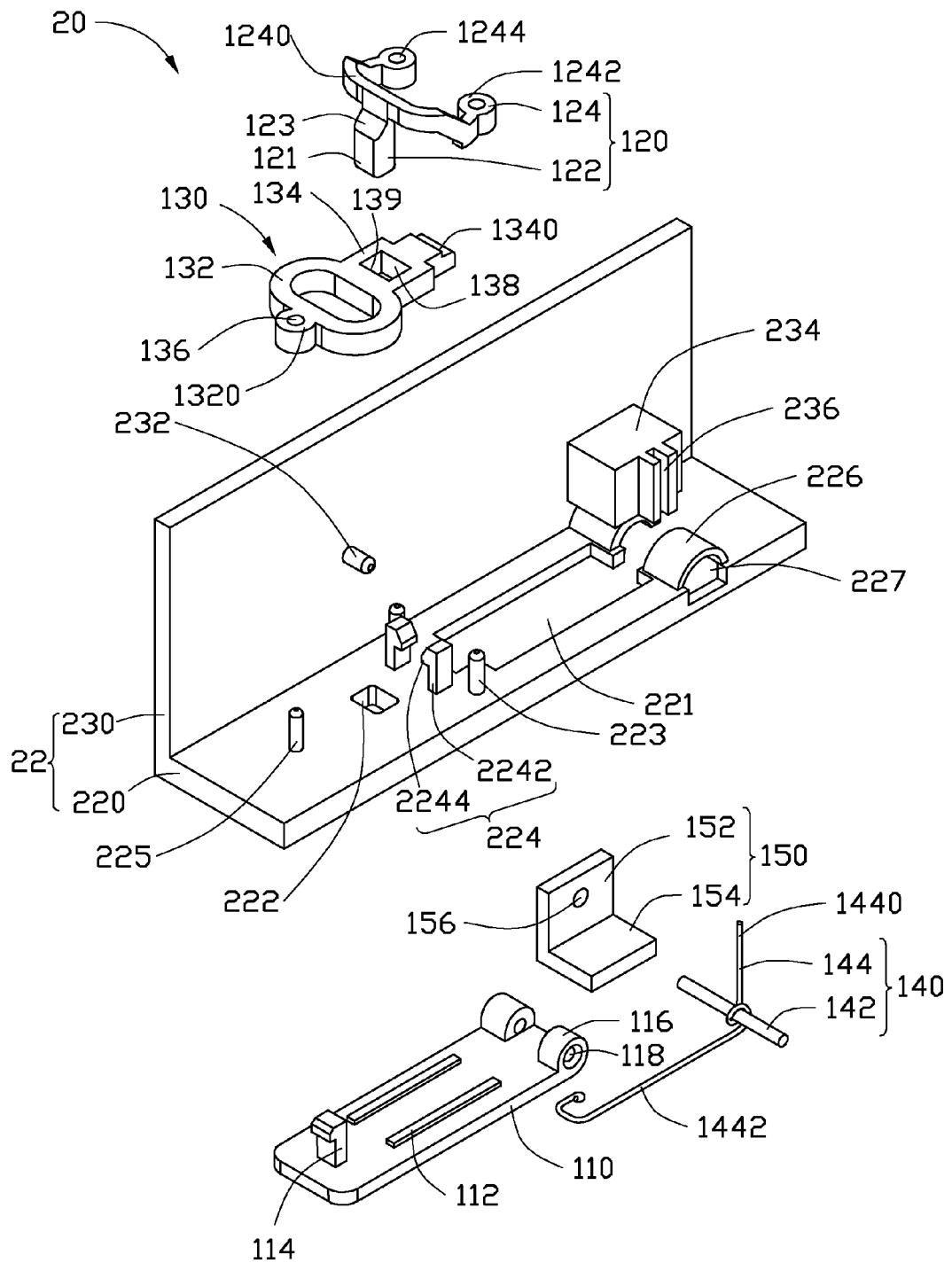
FIG. 2 is an exploded, isometric view of an exemplary cover mechanism used in an electronic device.
Figure 3:
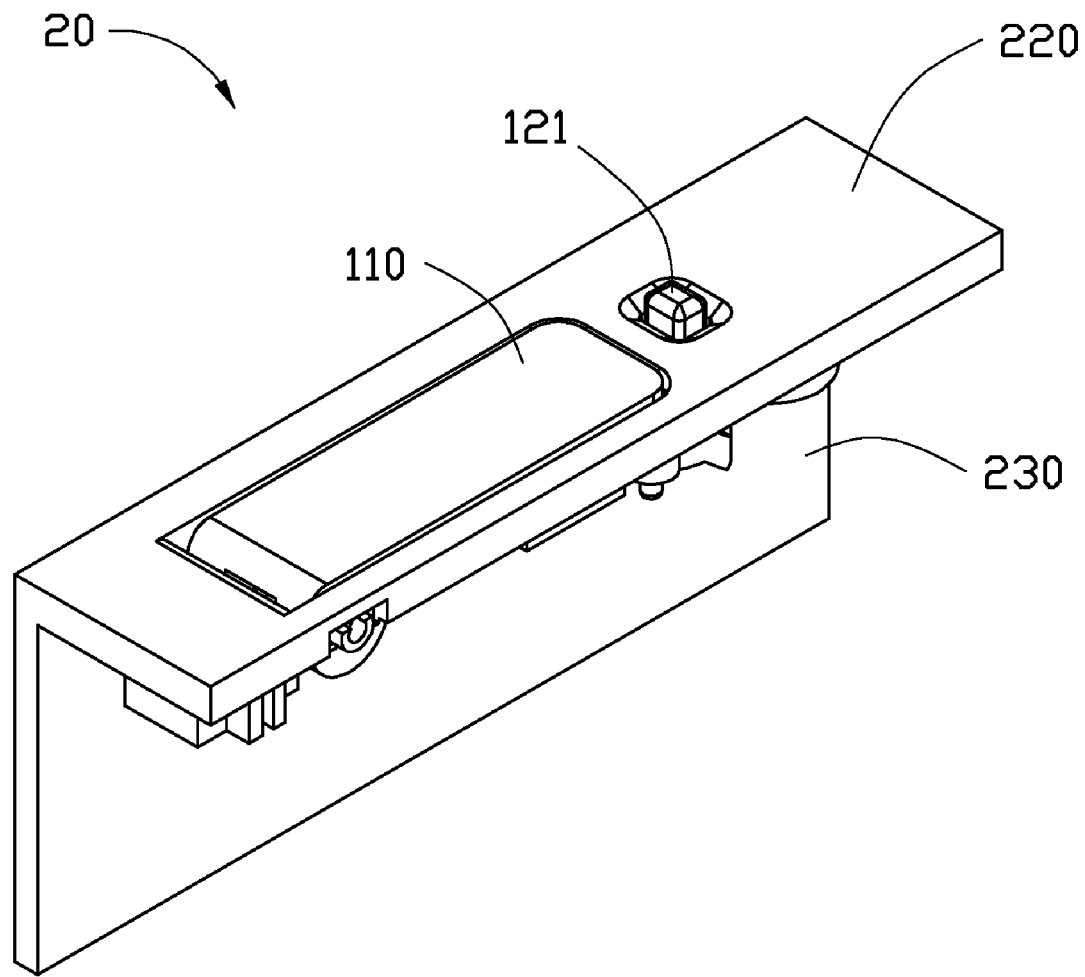
FIG. 3 is similar to FIG. 1, but shown from another aspect.

FIGS. 1 to 3 show an exemplary embodiment of a cover mechanism 100 used with an electronic device 20, such as a mobile phone.

The electronic device 20 includes a main body 22. The main body 22 includes at least one first wall 220 perpendicularly connected to one second wall 230. The first wall 220 defines an opening 221 and a latching hole 222. In this embodiment, the opening 221 is a connector interface hole. The first wall 220 forms two posts 223, two guiding blocks 224, and a pin 225 at one side of the opening 221. A distance between the two posts 223 is smaller than the distance between the two guiding blocks 224. Each guiding block 224 includes a guiding portion 2242 and a hooked portion 2244. The guiding portion 2242 perpendicularly extends from the first wall 220. The first wall 220 forms two receiving portions 226 at the other side of the opening 221. Each receiving portion 226 defines a receiving cavity 227. The second wall 230 forms a column 232 and an alignment block 234. The column 232 is substantially coplanar with the posts 223. The block 234 is adjacent to the receiving portion 226, and defines a slot 236.

The cover mechanism 100 includes a protective cover 110, a control element 120, a resisting element 130, a releasable element 140, and a stopper element 150.

The protective cover 110 is used for covering the opening 221. An inner surface of the protective cover 110 forms two parallel ribs 112, an arm 114, and two barrel portions 116. The arm 114 is opposite to the barrel portions 116. Each barrel portion 116 may be received in a corresponding cavity 227. Each barrel portion 116 defines a central hole 118.

The control element 120 can be made of, for example, plastic, and includes an operating portion 122 and a latching portion 124. The operating portion 122 includes a pressed end 121 and a wedged end 123. The pressed end 121 can be received in the latching hole 222 for conveniently being pressed. The latching portion 124 includes an arcuate body 1240 and two cylindrical locking ends 1242. A middle area of the arcuate body 1240 is connected to the wedged end 123. Each locking end 1242 defines a locking hole 1244.

The resisting element 130 includes a main section 132 and a resisting section 134. The main section 132 is substantially an elliptical frame, and includes a fixed end 1320. The fixed end 1320 defines a fixed hole 136 for receiving the pin 225. The resisting section 134 is substantially a stepped plate, and defines a wedged hole 138 with a wedged wall 139. The wedged wall 139 is engagable with the wedged end 123. The resisting section 134 includes a latching end 1340 for latching with the arm 114.

The releasable element 140 includes a shaft 142 and a torsion spring 144 placed around the shaft 142. The shaft 142 is engagable in the central holes 118 of the barrel portions 116. The torsion spring 144 is a metal wire with a coiled middle portion. The torsion spring 144 includes a first portion 1440 and a second portion 1442. The second portion 1442 has a hooked distal end.

The stopper element 150 is substantially L-shaped, and includes a fixed plate 152 and a stopper plate 154. The fixed plate 152 defines a column hole 156. The stopper plate 154 is perpendicularly connected to the fixed plate 152 for limiting the movement of the control element 120.

Figure 4:
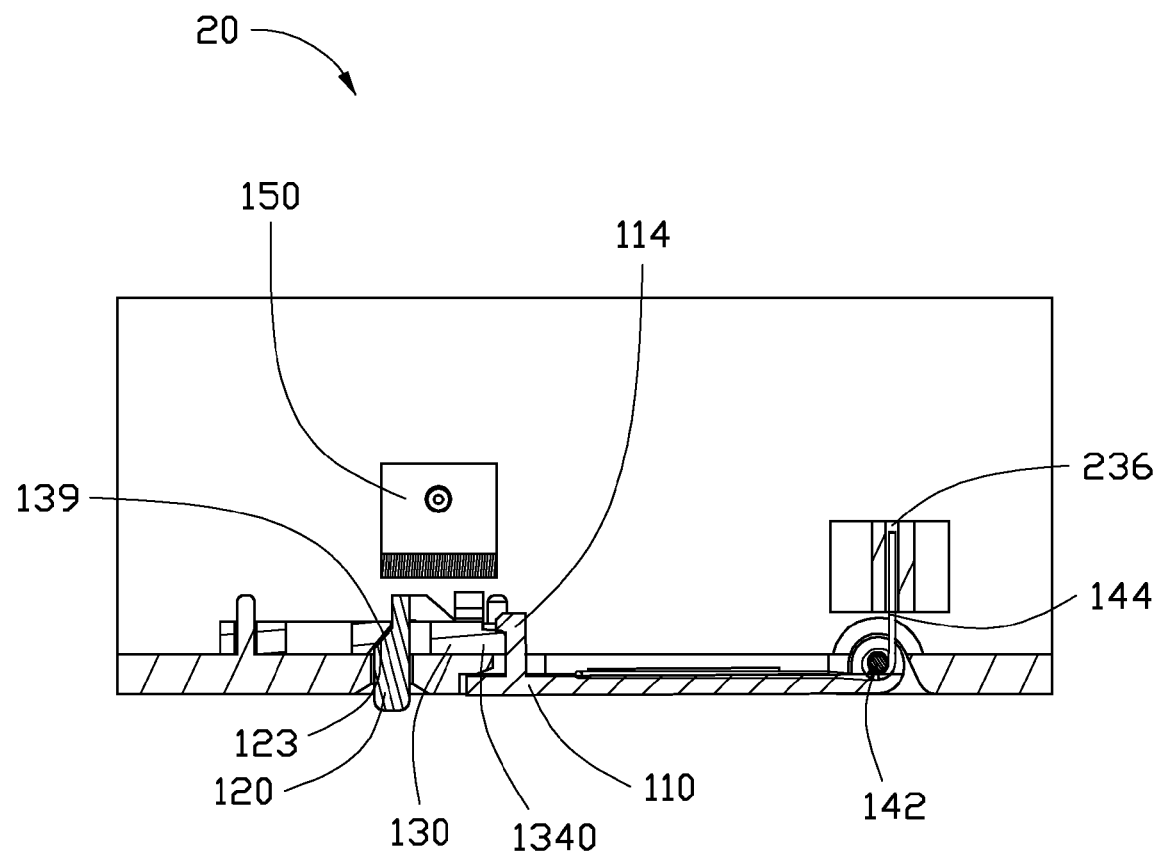
FIG. 4 is a cross-sectional view of the exemplary cover mechanism of FIG. 1 along IV-IV direction showing it in a closed position.
Figure 5:
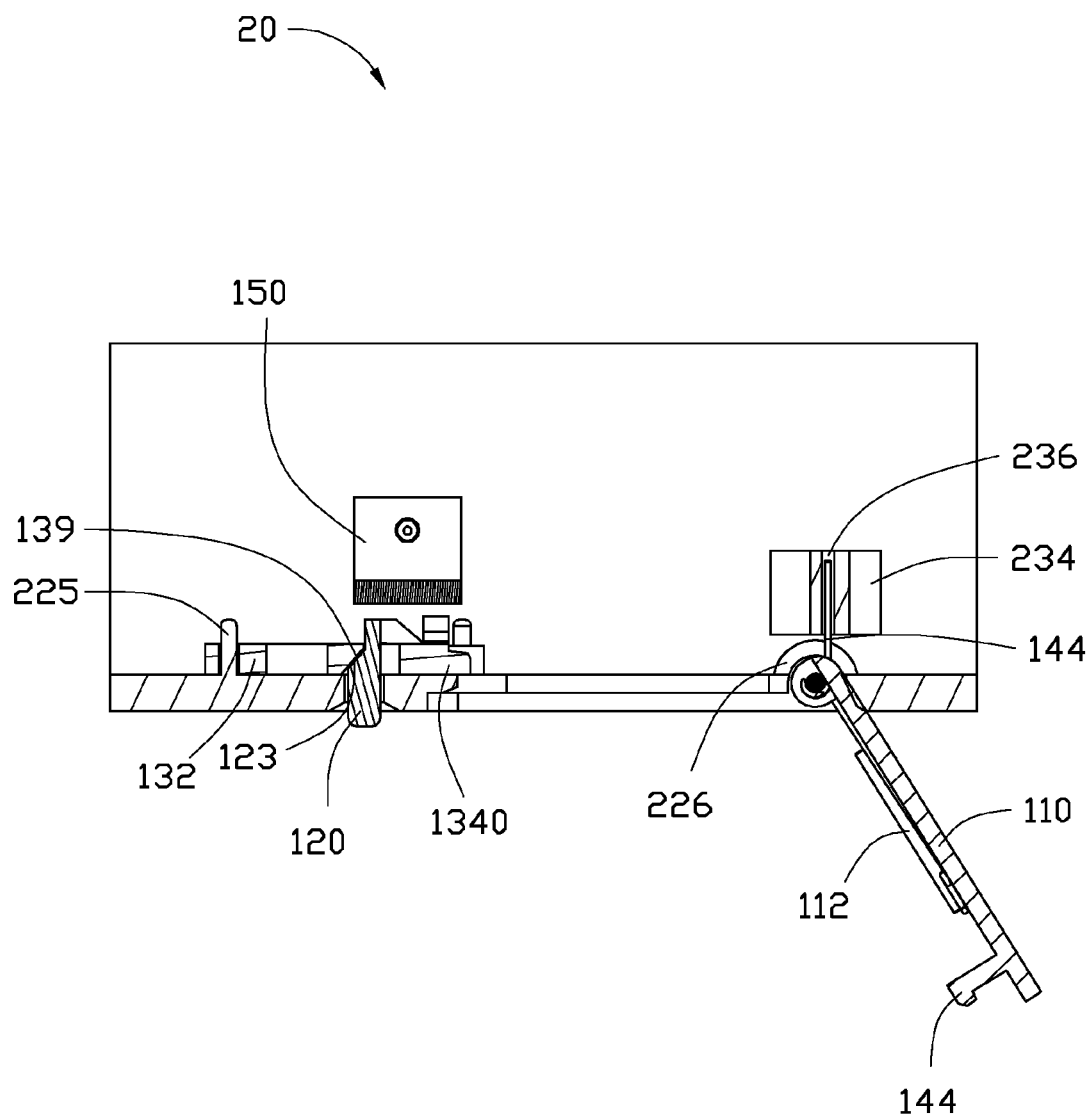
FIG. 5 is a cross-sectional view of the exemplary cover mechanism of FIG. 1 along IV-IV direction showing it in an opened position.

In FIGS. 4 and 5, when the cover mechanism 100 is assembled, the resisting element 130 is positioned on the first wall 220. The resisting section 134 is clamped between the guiding blocks 224. The pin 225 is inserted into the fixed hole 136 of the fixed end 1320. The wedge hole 138 is aligned with the latching hole 222. Then, the control element 120 is positioned above the resisting element 130. The arcuate body 1240 of the latching portion 124 spans a top portion of the resisting section 134. The posts 223 are respectively inserted into the locking holes 1244. At the same time, the operating portion 122 extends through the wedge hole 138 and the latching hole 222. The pressed end 121 is exposed from the latching hole 222, and the wedged end 123 resists the wedge wall 139. After that, the column 232 is inserted into the column hole 156 of the fixed plate 152 so that the stopper element 150 is fixed at one side of the control element 120. The second portion 1442 of the torsion spring 144 is fixed between the ribs 112. The shaft 142 is inserted into the central holes 118 for assembling the releasable element 140 to the protective cover 110. The barrel portions 116 are respectively received in the receiving cavities 227, and the first portion 1440 of the torsion spring 144 is received in the slot 236. The protective cover 110 is rotated until the arm 114 extends into the opening 221 and latches with the latching end 1340. Thus, the cover mechanism 100 is completely assembled to the electronic device 20.

When the protective cover 110 is to be opened, the operator may press the pressed end 121 of the operating portion 122. The wedged end 123 pushes the main section 132. The main section 132 deforms to move away from the protective cover 110 so that the latching end 1340 separates from the arm 114. The torsion spring 144 provides a torsion force to automatically open the protective cover 110. Therefore, the opening 221 is exposed from the first wall 220 and ready for use.

To close and lock the cover mechanism 100, the above process is reversed with the protective cover 110 moved from the open position to the closed position. The closing process ends with the arm 114 latching the latching end 1340.

It is to be understood, however, that even through numerous characteristics and advantages of the exemplary invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A cover mechanism for an electronic device, the cover mechanism comprising:
   a protective cover;
   a resisting element attached to the electronic device;
   a control element engaging with the resisting element, the protective cover latching to the control element; and
   a releasable element providing a force to the protective cover for automatically opening the protective cover;
   wherein when the control element is pressed, the control element forces the resisting element to unlock the protective cover; wherein the control element includes an operating portion, the operating portion includes a pressed end and a wedged end, the resisting element includes a wedge hole with a wedge wall, the pressed end is received in the wedge hole, and the wedged end engages with the wedge wall.

2. The cover mechanism as claimed in claim 1, wherein the control element includes a latching portion connected to the operating portion, the latching portion includes an arcuate body and two cylindrical locking ends, and the arcuate body is connected to the wedged end.

3. The cover mechanism as claimed in claim 2, wherein each locking end defines a locking hole, and the electronic device forms two posts for being engaged in the locking holes.

4. The cover mechanism as claimed in claim 1, wherein the resisting element includes a main section and a resisting section, the electronic device forms two guiding blocks, the guiding blocks clamping the resisting section.

5. The cover mechanism as claimed in claim 4, wherein the main section is substantially an elliptical frame, and includes a fixed end, the fixed end defines a fixed hole.

6. The cover mechanism as claimed in claim 5, wherein the resisting section defines a wedged hole with a wedged wall and forms a latching end, the protective cover forms an arm, and the arm latches the latching end.

7. The cover mechanism as claimed in claim 1, wherein the releasable element includes a shaft and a torsion spring placed around the shaft, one portion of the torsion spring is attached to the protective cover, and another portion of the torsion spring is attached to the electronic device.

8. The cover mechanism as claimed in claim 7, wherein the protective cover forms two parallel ribs, the torsion spring includes a first portion and a second portion, the first portion is positioned between the ribs.

9. The cover mechanism as claimed in claim 7, wherein the protective cover forms two barrel portions, each barrel portion defines a central hole, and the shaft is received in the central holes.

10. The cover mechanism as claimed in claim 7, wherein the torsion spring is formed by a metal wire coiled to one loop in a middle portion.

11. The cover mechanism as claimed in claim 1, further comprising a stopper element, wherein the stopper element includes a fixed plate and a stopper plate, the fixed plate is attached to the electronic device, the stopper plate is perpendicularly connected to the fixed plate for limiting the movement of the control element.

12. An electronic device, comprising:
    a main body;
    a cover mechanism, comprising:
        a protective cover;
        a resisting element attached to the main body;
        a control element engaging with the resisting element, the protective cover latching to the control element; and
        a releasable element providing a force to the protective cover for automatically opening the protective cover; wherein the control element includes an operating portion, the operating portion includes a pressed end and a wedged end, the resisting element includes a wedge hole with a wedge wall, the pressed end is received in the wedge hole, and the wedged end engages with the wedge wall.

13. The electronic device as claimed in claim 12, wherein the releasable element includes a shaft and a torsion spring placed around the shaft, one portion of the torsion spring is attached to the protective cover, and another portion of the torsion spring is attached to the electronic device.

14. The electronic device as claimed in claim 13, wherein the protective cover forms two parallel ribs, the torsion spring includes a first portion and a second portion, the second portion is positioned between the ribs.

15. The electronic device as claimed in claim 13, wherein the protective cover forms two barrel portions, each barrel portion defines a central hole, and the shaft is received in the central holes.

16. The electronic device as claimed in claim 13, wherein the resisting element includes a main section and a resisting section, the electronic device forms two guiding blocks, the guiding blocks clamping the resisting section.

* * * * *